US008588498B2

(12) United States Patent
Novak et al.

(10) Patent No.: US 8,588,498 B2
(45) Date of Patent: Nov. 19, 2013

(54) SYSTEM AND METHOD FOR SEGMENTING BONES ON MR IMAGES

(75) Inventors: Gabor Novak, Szeged (HU); Milan Redele, Varpalota (HU); Marta Fidrich, Szeged (HU); Tamas Ungi, Kingston (CA)

(73) Assignee: General Electric Company, Schenectady, NY (US)

(*) Notice: Subject to any disclaimer, the term of this patent is extended or adjusted under 35 U.S.C. 154(b) by 87 days.

(21) Appl. No.: 13/295,681

(22) Filed: Nov. 14, 2011

(65) Prior Publication Data

US 2013/0083987 A1   Apr. 4, 2013

Related U.S. Application Data

(60) Provisional application No. 61/541,801, filed on Sep. 30, 2011.

(51) Int. Cl.
G06K 9/00 (2006.01)

(52) U.S. Cl.
USPC .......................................................... 382/131

(58) Field of Classification Search
None
See application file for complete search history.

(56) References Cited

U.S. PATENT DOCUMENTS

| 5,889,882 | A | 3/1999 | Senn et al. | |
|---|---|---|---|---|
| 6,466,813 | B1 | 10/2002 | Shukla et al. | |
| 2003/0181831 | A1* | 9/2003 | Tanaka et al. | 600/587 |
| 2008/0273777 | A1* | 11/2008 | Luboz et al. | 382/130 |
| 2009/0226060 | A1* | 9/2009 | Gering et al. | 382/128 |
| 2010/0032575 | A1* | 2/2010 | Iagaru et al. | 250/362 |
| 2010/0054525 | A1* | 3/2010 | Gong et al. | 382/100 |

OTHER PUBLICATIONS

Clare Poynton, Mark Jenkinson, and William Wells, Iii 2009. Atlas-Based Improved Prediction of Magnetic Field Inhomogeneity for Distortion Correction of EPI Data. MICCAI '09, Springer-Verlag, Berlin, Heidelberg, 951-959.*
Baiker, Martin et al. "Atlas-based whole-body segmentation of mice from low-contrast Micro-CT data." Medical Image Analysis 14.6 (May 2010) : 723-737.*
Van Straten, Marcel, et al. "Removal of bone in CT angiography of the cervical arteries by piecewise matched mask bone elimination." Medical physics 31 (2004): 2924.*
Frangi et al, Multiscale vessel enhancement filtering, In Medical Image Computing and Computer-Assisted Intervention, Lecture Notes in Computer Science, vol. 1496, 1998, pp. 130-137.

* cited by examiner

Primary Examiner — Nirav G Patel
(74) Attorney, Agent, or Firm — Ziolkowski Patent Solutions Group, SC

(57) ABSTRACT

A method for segmenting bones on magnetic resonance (MR) images includes retrieving an MR image and performing an enhancement process on the MR image to generate a bone enhanced MR image. The bone enhanced MR image is then registered to a computer tomography (CT) based bone atlas. An MR image with bone segmentation is generated by segmenting the bone enhanced MR image using the CT based bone atlas as a mask. The MR image with bone segmentation may be presented on a display.

20 Claims, 3 Drawing Sheets

SYSTEM AND METHOD FOR SEGMENTING BONES ON MR IMAGES

CROSS REFERENCE TO RELATED APPLICATION

The present application claims the benefit of U.S. Provisional Application Ser. No. 61/541,801, filed Sep. 30, 2011, herein incorporated by reference in its entirety

TECHNICAL FIELD

The present invention relates generally to magnetic resonance imaging (MRI) systems and in particular, to a system and method for automatically segmenting bones on MR images.

BACKGROUND

During clinical diagnosis, the internal anatomy of a patient is imaged to determine how a certain disease has progressed. For example, the images may be used to help distinguish between infected tissues and healthy tissues within the patient. The images are also useful for radiotherapy treatment or planning or for surgical planning. Several modalities are used to generate images or functionality of anatomy of a patient which are suitable for diagnostic purposes, radiotherapy treatment or surgical planning. Examples include conventional X-ray imaging, computed tomography (CT) imaging, magnetic resonance imaging (MRI), and nuclear medicine imaging techniques, such as positron emission tomography (PET) and single photon emission computer tomography (SPECT).

In the case of radiation treatment (RT) planning, CT imaging is generally used because image voxel gray values (measured in Hounsfield Units) can be used directly in the calculation of radiation dosage. Clinicians, such as radiologists, dosimetrists or radiotherapists, typically must trace the outline of a few critical structures on a large number of images for RT planning. Manually drawing the individual contours on a contiguous set of 2D slices and combining them to form 3D volumes is very time consuming and labor intensive. The time and labor increases significantly with the number of image slices in the image set, as well as the number and size of the organs, tumors, etc. in the anatomical area of interest. The quality of the contouring and the resulting 3D objects depend on the resolution and contrast of the 2D images, and on the knowledge and judgment of the clinician performing the reconstruction. Accordingly, automated segmentation methods have been developed to address several of the problems with manual segmentation.

Typically, simulated CT images and digitally reconstructed radiographs (DRRS) are created for use in radiation therapy planning. The segmentation of bones is a critical task for the creation of a simulated CT and for the overall treatment plan. The bones have the largest electron density value in the body, which is in direct relation with the attenuation of ~100 keV X-rays used in CT scanners, as well as the MeV rays used in radiation therapy. Accordingly, the accurate segmentation of bones is crucial to the entire process. However, if MR images are used, it is a difficult task to separate bone structures from other tissues on MR images. Many existing segmentation techniques for extracting bones on MR images, however, have disadvantages such as a risk of falsely classifying tissue and organs as bone and are not able to be automated.

It would be desirable to provide a system and method for automatically segmenting bones on MR images that provides improved performance including reliability and precision.

BRIEF DESCRIPTION OF THE INVENTION

In accordance with an embodiment, a method for segmenting bones on magnetic resonance (MR) images includes retrieving an MR image, performing an enhancement process on the MR image to generate a bone enhanced MR image, registering a computer tomography (CT) based bone atlas to the bone enhanced MR image, generating an MR image with bone segmentation by segmenting the bone enhanced MR image using the CT based bone atlas as a mask and displaying the MR image with bone segmentation on a display.

In accordance with another embodiment, a system for segmenting bone on magnetic resonance (MR) images includes a storage comprising at least one set of MR images, an operator console configured to receive input information and display images; and a processor coupled to the storage and to the operator console, the processor programmed to retrieve an MR image from the storage, perform an enhancement process on the MR image to generate a bone enhanced MR image, register a computer tomography (CT) based bone atlas to the bone enhanced MR image, generate an MR image with bone segmentation by segmenting the bone enhanced MR image using the CT based bone atlas as a mask, and display the MR image with bone segmentation on a display of the operator console In accordance with yet another embodiment, a non-transitory computer readable storage medium having a program for performing a method for segmenting bones on magnetic resonance (MR) images, includes program code for retrieving an MR image, program code for performing an enhancement process on the MR image to generate a bone enhanced MR image, program code for registering a computer tomography (CT) based bone atlas to the bone enhanced MR image, program code for generating an MR image with bone segmentation by segmenting the bone enhanced MR image using the CT based bone atlas as a mask and program code for displaying the MR image with bone segmentation on a display.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
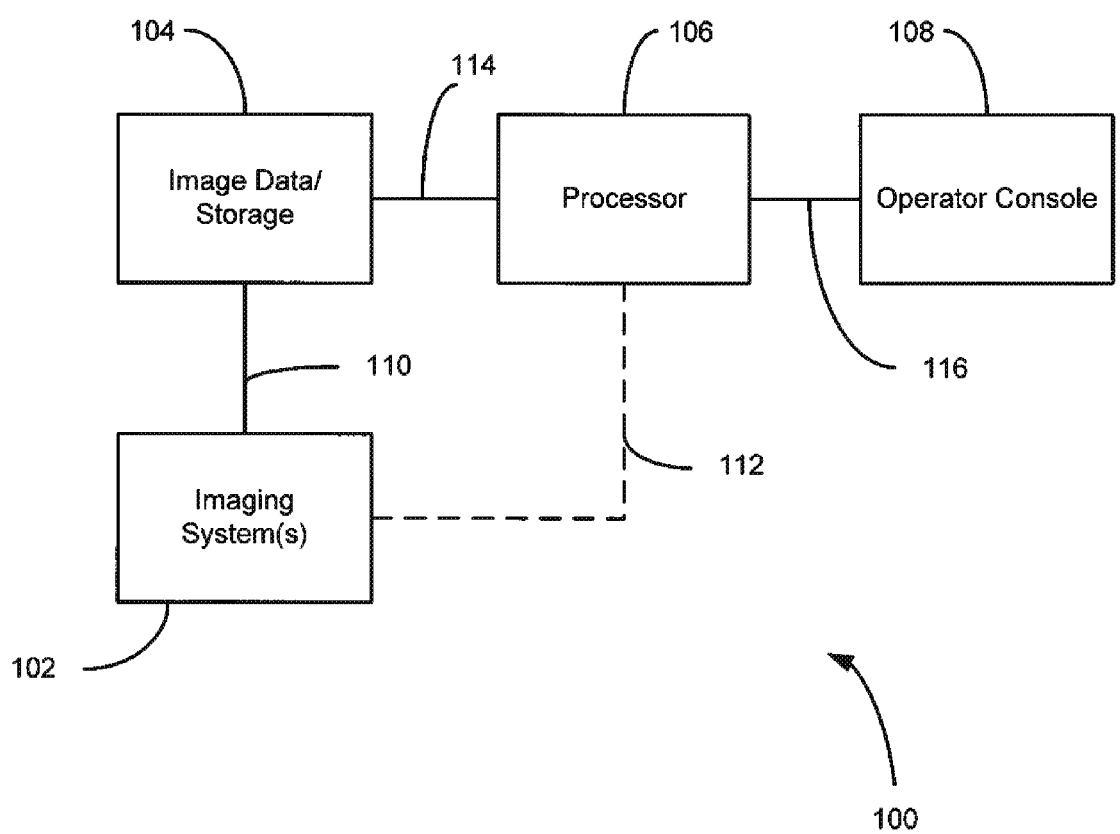
FIG. 1 is a schematic block diagram of a system for automatic segmentation of bone on MR images in accordance with an embodiment.

FIG. 1 is a schematic block diagram of a system for automatic segmentation of bone on MR images in accordance with an embodiment. In system 100, image data is stored in storage or memory 104. Storage 104 may be capable of storing sets of data or images generated by one or more imaging systems 102 or images and data generated using processor 106 and operator console 108. Storage 104 may be, for example, integrated into the imaging system 102 or processor 106 or may be remotely located and connected to the imaging system 102 and processor 106 through a network. Storage 104 may be for example, a PACS storage, an archival media device, permanent or back-up memory storage.

Images and image data may be generated by one or more imaging systems 102. Imaging system(s) 102 may be, for example, a computer tomography (CT) system, a magnetic resonance imaging (MRI) system, a conventional X-ray imaging system, or nuclear medicine imaging system such as positron emission tomography (PET) and single proton emission computer tomography (SPECT). Imaging system(s) 102 are configured to generate image data sets and images. The image data may be communicated through a link 110 to storage 104 or through a link 112 to the processor 106. Image data may also be communicated from storage 104 to the processor 106 though a link 114. Links 110, 112 and 114 may be direct wired links or may be fiber optic connections or wireless communication links or the like.

The image data may be further processed by processor 106 and conveyed to the operator console 108. Image data may be requested or retrieved by processor 106 from storage 104 or received by processor 106 from imaging system(s) 102. Processor 106 may be, for example, a central processing unit (CPU), a microprocessor, a microcontroller, and/or the like as known in the art. Processor 106 may be an integrated component or may be distributed across various locations. In one embodiment, processor 106 and operator console 108 may be part of an operator workstation. Processor 106 may be configured to perform or execute methods and control functions for well-known image processing techniques such as reconstruction, image data memory storage, segmentation and the like. In addition, processor 106 is configured to perform or execute a method for segmenting bones on MR images as described below with reference to FIGS. 2 and 3.

Processor 106 is also coupled to and communicates with an operator console 108 via a link 116. Link 116 may be a direct wired link or may be a fiber optic connection or wireless communication link or the like. Operator console 108 provides an interface for an operator to, for example, display images, perform image processing on the images, archive data and images and control and/or monitor other functions of system 100. Operator console 108 may include elements such as an input device, a control panel, and a display. The input device may include, a mouse, joystick, keyboard, track ball, touch activated screen, light wand, voice control, or any similar or equivalent input device. Processor 106 may be configured to receive input information from the operator console 108 and generate an output that may be displayed on a display of the operator console 108. Data, such as images, may be communicated through link 116 from processor 106 to operator console 108.

Figure 2:
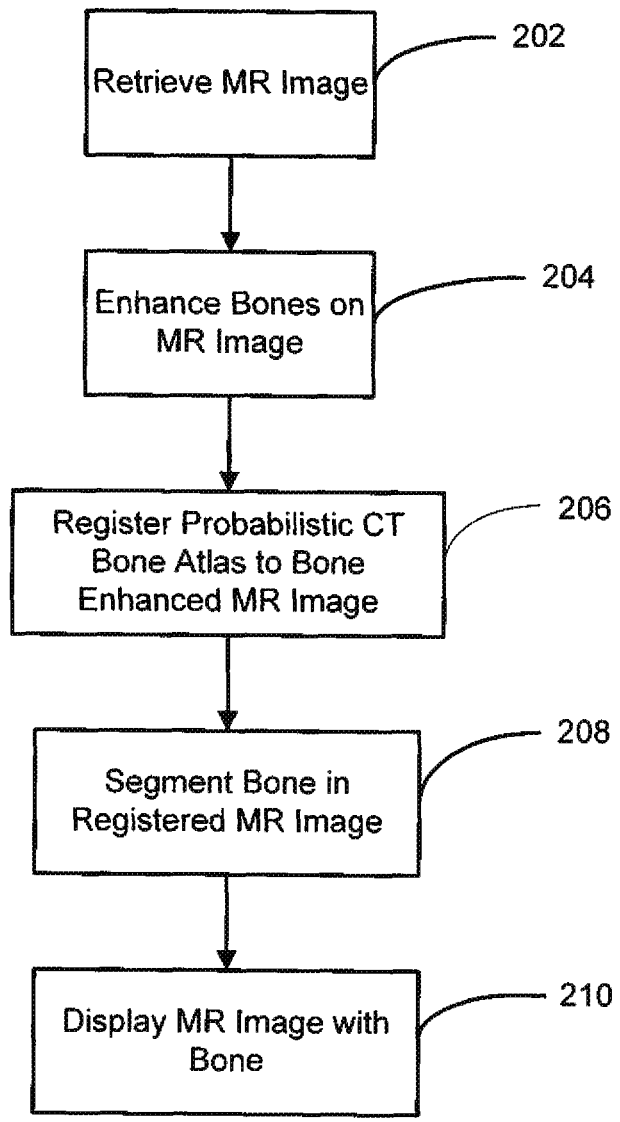
FIG. 2 illustrates a method for automatically segmenting bones in MR images in accordance with an embodiment.
Figure 3:
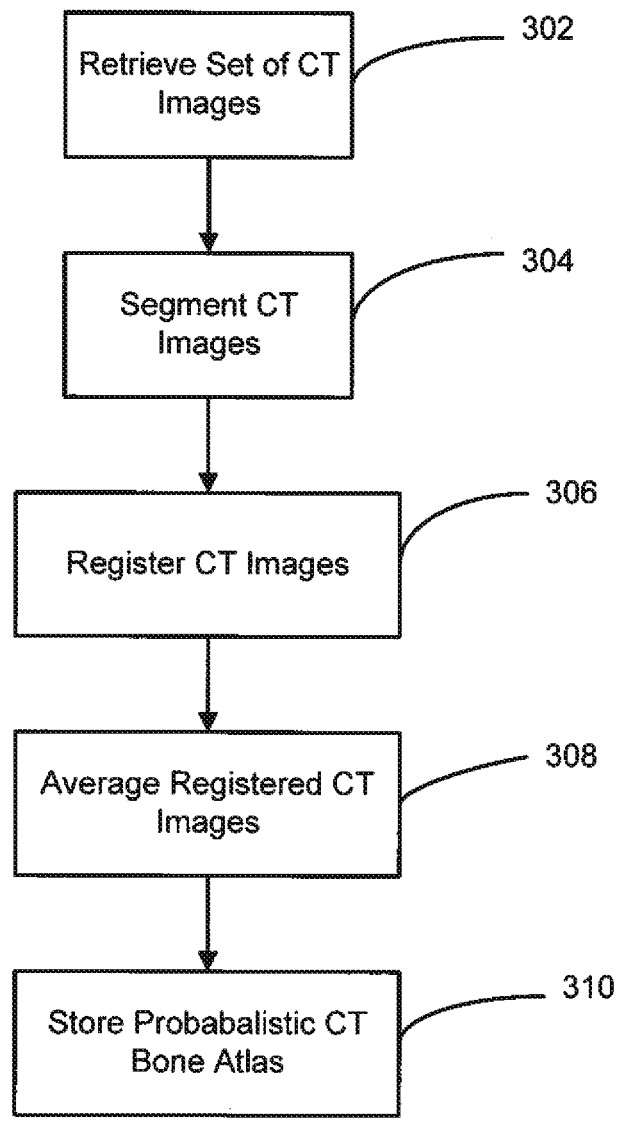
FIG. 3 illustrates a method for generating a probabilistic CT bone atlas in accordance with an embodiment.

FIG. 2 shows a method for automatically segmenting bones on MR images in accordance with an embodiment. The method may be implemented using a system such as described above with respect to FIG. 1 or any similar or equivalent system for segmenting images. At block 202, an MR image is retrieved from storage or memory such as storage 104 shown in FIG. 1. The MR image may be, for example, a T1 weighted three dimensional (3D) MR image, a proton density weighted MR image, or other known type of MR image. Once the MR image is retrieved, a process is performed at block 204 to enhance the bones on the MR image and generate a bone enhanced MR image. The bone enhancement process may be one known in the art that enhances plate-like (e.g., bones) or bony structures. In one embodiment, the bone enhancement may be an edge sharpening of the MR image. In another embodiment, a generalized version of the Frangi Vesselness function may be used. This method is based on the eigenvalue analysis of the Hessian matrix at every voxel at a given scale which results in obtaining shape characteristics. For example, the plate-like structures may be enhanced at a scale of 2 mm. In this method, other structures may be enhanced as well, in particular, the skin of the patient. Accordingly, a skin removal step may also be needed, after which registration may be performed on the bone enhanced MR image with more reliable results.

The bone enhanced MR image is segmented using a CT based bone atlas as a mask. In an embodiment, the CT based bone atlas is a probabilistic bone atlas created from CT images using the method illustrated in FIG. 3. The method may be implemented using a system such as described above with respect to FIG. 1 or any similar or equivalent system. At block 302, a set of CT images is retrieved from storage or memory such as storage 104 shown in FIG. 1. The set of CT images includes images from multiple subjects and may be, for example, of the same type of bone. A bone segmentation is performed on the set of CT images at block 304 to generate a set of bone segmented CT images with segmented bone volumes. Bone segmentation methods known in the art may be used. In one embodiment, the bone segmentation method separates the voxels in the CT images by density using a predefined threshold value. For example, voxels with a density value above a threshold value (e.g., a threshold value between 300-500 Hounsfield units) may be assigned as bone in the images. In one embodiment, the threshold value is 400 Hounsfield units.

At block 306, the set of bone segmented CT images is registered. In an embodiment, an image from the set of CT images is selected as a reference image to which the remaining images are registered (or transformed). For example, the CT image with the largest dimension in the set of CT images may be selected as the reference image and the remaining bone segmented CT images in the set are transformed to the reference image (e.g., scaled to the image size of the reference image). The registration method may be one generally known in the art and may include rotation, translation and scaling of the segmented bone volumes of the CT images to the selected reference image. In one embodiment, for head CT images an initial rotation transformation should be applied because of the variability of head rotation around the x (left/right) axis. At block 308, the registered set of bone segmented CT images are averaged using known methods to generate the probabilistic CT based bone atlas. The higher the number of CT images in the set of CT images, the better the reliability of the resulting probabilistic bone atlas. The CT based bone atlas is then stored in, for example, storage or memory 104 as described above with respect to FIG. 1.

Returning to FIG. 2, at block 206, the CT based bone atlas is retrieved from storage and is registered (or transformed) to the bone enhanced MR image (generated at block 204) in order to obtain a proper mask to remove unneeded structures from the bone enhanced MR image. In an embodiment, the registration at block 206 includes two steps. A rigid registration is performed and then a non-rigid registration. The rigid registration translates and rotates the CT based bone atlas to the bone enhanced MR image. In one embodiment, the rigid registration uses Mattes Mutual Information as a metric and Regular Step Gradient Descent as an optimizer. The Mattes Mutual Information metric uses mutual information as a similarity criterion. In an embodiment, the registration is a basic multi-resolution type method that, for example, uses two pyramid levels and the resulting registration transformation (translation and rotation) is applied around the center of the image. Inherent differences on images can produce significant non-linear motion between two acquisitions. To recover this motion, local deformations modeled with cubic B-splines may be incorporated into the transformation. The deformation may be defined on a regular grid and is parameterized by potentially several thousand coefficients. The non-rigid registration is used to account for variations in bone anatomies, for example, in the case of a skull. The registration at block 206 results in the CT based bone atlas being registered to the bone enhanced MR image.

At block 208, bone is segmented on the bone enhanced MR image. The CT based bone atlas is used as a mask to remove any unneeded structures resulting in an MR image with segmented or contoured bones (for example, cortical bones). In one embodiment, a hole-filling method may be used to complete the contouring of the bones. The hole-filling method may be one generally known in the art. The result of the segmentation at block 208 is an MR image with bone segmentation. At block 210, the segmented MR image with bone is displayed, for example, using a display of an operator console as described above with respect to FIG. 1. In an embodiment, the segmented MR image may also be stored in, for example, storage 104 shown in FIG. 1.

Computer-executable instructions for segmenting bones on MR images according to the above-described method may be stored on a form of computer readable media. Computer readable media includes volatile and nonvolatile, removable and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired instructions and which may be accessed by system (shown in FIG. 1), including by internet or other computer network forms of access.

A technical effect of the disclosed system and method is that it provides for a computer-implemented technique for automatically segmenting bones on MR images.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. The order and sequence of any process or method steps may be varied or re-sequenced according to alternative embodiments.

Many other changes and modifications may be made to the present invention without departing from the spirit thereof. The scope of these and other changes will become apparent from the appended claims.

We claim:

1. A method for segmenting bones on magnetic resonance (MR) images, the method comprising:
   retrieving an MR image;
   performing an enhancement process on the MR image to generate a bone enhanced MR image;
   registering a computer tomography (CT) based bone atlas to the bone enhanced MR image;
   generating an MR image with bone segmentation by segmenting the bone enhanced MR image using the CT based bone atlas as a mask, and
   displaying the MR image with bone segmentation on a display.

2. A method according to claim 1, wherein the CT based bone atlas is a probabilistic bone atlas.

3. A method according to claim 1, wherein registering the CT based bone atlas to the bone enhanced MR image comprises translating and rotating the CT based bone atlas.

4. A method according to claim 3, wherein registering the CT based bone atlas to the bone enhanced MR image further comprises scaling the CT based bone atlas to an image size of the bone enhanced MR image.

5. A method according to claim 1, wherein the CT based bone atlas is created using acquired CT images of multiple subjects.

6. A method according to claim 1, wherein the MR image is a T1 weighted MR image.

7. A method according to claim 1, wherein the enhancement process comprises an edge sharpening process.

8. A method according to claim 1, wherein the enhancement process comprises skin removal.

9. A method according to claim 1, further comprising filling holes in a contour of the bones in the MR image with bone segmentation.

10. A method according to claim 1, wherein registering the CT based bone atlas to the bone enhanced MR image comprises a rigid registration.

11. A method according to claim 10, wherein registering the CT based bone atlas to the bone enhanced MR image further comprises a non-rigid registration.

12. A system for segmenting bone on magnetic resonance (MR) images, the system comprising:
    a storage comprising at least one set of MR images;
    an operator console configured to receive input information and display images; and
    a processor coupled to the storage and to the operator console, the processor programmed to:
      retrieve an MR image from the storage;
      perform an enhancement process on the MR image to generate a bone enhanced MR image;
      register a computer tomography (CT) based bone atlas to the bone enhanced MR image;
      generate an MR image with bone segmentation by segmenting the bone enhanced MR image using the CT based bone atlas as a mask; and
      display the MR image with bone segmentation on a display of the operator console.

13. A system according to claim 12, wherein the CT based bone atlas is a probabilistic bone atlas.

14. A system according to claim 12, wherein registering the CT based bone atlas to the bone enhanced MR image comprises translating and rotating the CT based bone atlas.

15. A system according to claim 14, wherein registering the CT based bone atlas to the bone enhanced MR image further comprises scaling the CT based bone atlas to an image size of the bone enhanced MR image.

16. A non-transitory computer readable storage medium having a program for performing a method for segmenting bones on magnetic resonance (MR) images, the computer readable storage medium comprising:
  program code for retrieving an MR image;
  program code for performing an enhancement process on the MR image to generate a bone enhanced MR image;
  program code for registering a computer tomography (CT) based bone atlas to the bone enhanced MR image;
  program code for generating an MR image with bone segmentation by segmenting the bone enhanced MR image using the CT based bone atlas as a mask; and
  program code for displaying the MR image with bone segmentation on a display.

17. A non-transitory computer readable storage medium according to claim 16, wherein the CT based bone atlas is a probabilistic bone atlas.

18. A non-transitory computer readable storage medium according to claim 16, wherein the program code for registering the CT based bone atlas to the bone enhanced MR image comprises program code for translating and rotating the CT based bone atlas.

19. A non-transitory computer readable storage medium according to claim 18, wherein the program code for registering the CT based bone atlas to the bone enhanced MR image further comprises program code for scaling the CT based bone atlas to an image size of the bone enhanced MR image.

20. A non-transitory computer readable storage medium according to claim 16, wherein the CT based bone atlas is created using acquired CT images of multiple subjects.

\* \* \* \* \*